United States Patent Office 3,639,612
Patented Feb. 1, 1972

3,639,612

CHALCOGEN CONTAINING HETEROCYCLICS AS AN IN VITRO ANTI-VIRAL AGENT

Donald C. De Long and Charles J. Paget, Jr., Indianapolis, Ind., assignors to Eli Lilly and Company, Indianapolis, Ind.

No Drawing. Filed May 16, 1969, Ser. No. 825,402
Int. Cl. A01n 9/00
U.S. Cl. 424—276 4 Claims

ABSTRACT OF THE DISCLOSURE

Derivatives of tricyclic chalcogen containing heterocycles useful as anti-viral agents and in differentiating Polio III from other polio viruses.

BACKGROUND OF THE INVENTION

Methyl 2-phenoxathiin ketone (2-acetylphenoxathiin) and related compounds are disclosed in Chem. Rev. 32, 173 (1943) and in J. Am. Chem. Soc. 71, 3102 (1949). The orientation of acyl derivatives of other tricyclic chalcogen containing heterocyclics is discussed in "Friedel-Crafts and Related Reactions" Olah (ed.), Interscience Publishers N.Y. (1964), pp. 84–99. Acetyl derivatives of most of these heterocycles are disclosed in articles referred to in the body of the text by number.

SUMMARY

This invention provides a method for suppressing the growth of viruses, particularly polio viruses, comprising the application to a virus habitat of an effective amount of a compound represented by the formula:

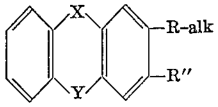

I wherein

X is oxygen, sulfur, sulfoxide or sulfone;

Y is sulfur, oxygen, sulfoxide, sulfone, NH, methylene, ethylene, vinyl or a direct bond;

R is $\overset{O}{\overset{\|}{C}}$, CHOR', $\overset{NOH}{\overset{\|}{C}}$, or $\overset{OH}{\underset{alk}{C}}$ R' is hydrogen or $-\underset{\underset{O}{\|}}{C}-alk$ R'' is hydrogen or methyl; and alk is $C_1$–$C_3$ alkyl In the above formula when X and Y are both oxygen, the resulting tricyclic chalcogen heterocyclic is named dibenzo-p-dioxane. When one of X and Y is sulfur and the other is oxygen, the resulting compounds are phenoxathiins. When both X and Y are sulfur, the resulting compound is thianthrene. When X is oxygen or sulfur and Y is NH, the resulting compounds are phenoxazines or phenothiazines. When X is oxygen or sulfur and Y is methylene, the resulting compounds are xanthenes or thiaxanthenes. When X is oxygen or sulfur and Y is a direct bond, the resulting compounds are dibenzofurans and dibenzothiophenes. When X is oxygen or sulfur and Y is vinyl, the resulting compounds are dibenzo[b,f]oxepins or dibenzo[b,f]thiepins. Finally, when Y is ethylene, the compounds are named dihydrodibenz[b,f]oxepins or dihydrodibenz[b,f]thiepins. In the above formula, the term $C_1$–$C_3$ alkyl includes the methyl, ethyl, n-propyl and isopropyl groups.

The preferred groups of compounds are those in which one of X or Y is sulfur and the other is oxygen, R, R'''' and alk having the same meaning as heretofore.

Typical compounds coming within the scope of the above formula include the following:

2-(2-hydroxybutyl)dibenzo[b,f]thiepin
2-(1-ethoxymethyl)thianthrene
2-(1-hydroxy-1-ethylethyl)-3-methylphenoxathiin
2-(1-n-propoxyethyl)xanthene
2-(1-isopropoxypropyl)thiaxanthene
2-n-propionyldibenzofurane
2-isobutyryldibenzothiophene
2-n-butyryldibenzo[b,f]oxepin
2-(1-hydroxy-n-propyl)phenothiazine
2-(1-n-propionoxyethyl)dihydrodibenz[b,f]oxepin
2-(1-n-butoxyethyl)dihydrodibenz[b,f]thiepin
2-(1-acetoxy-n-propyl)phenoxazine
n-propyl 2-dibenzo[b,f]thiepinyl ketone oxime
ethyl 2-xanthenyl ketone oxime
isopropyl 2-thiaxanthenyl ketone oxime
2-(1-hydroxy-1-n-propyl)ethyl thianthrene
2-(1-hydroxy-1-ethyl)ethyl dibenzofurane
2-(1-methoxypropyl)dibenzothiophene
2-(1-ethoxyisopropyl)dibenzo[b,f]oxepin
2-(1-ethoxyethyl)phenothiazine
2-(1-isopropyloxyethyl)phenoxazine The ability of compounds coming within the scope of the above formula to suppress the growth of different viruses in vitro is readily demonstrated by using a plaque suppression test similar to that described by Siminoff, Applied Microbiology, 9 (1), 66–72 (1961). The test proceeds as follows. The tests are carried out using rectangular glass boxes measuring 7½ inches x 15 inches x 1½ inches, made of pieces of double strength plate glass sealed together with silicone rubber cement. The glass boxes are covered with a glass lid and before use are sterilized by dry heat at a temperature of about 300° C. An approximately $10^6$/ml. BS–C–1 (serial culture of Cercopithecus monkey kidney) cell suspension is made in a medium composed of medium 199 together with 5 percent calf serum, 150 units/ml. of penicillin, and 150 mcg./ml. of streptomycin. Two hundred fifty milliliters of the suspension are added to each sterilized glass box, and the boxes are incubated at about 37° C. for about 96 hours in a level position. After incubation, the medium is carefully drawn off leaving a monolayer of cells undisturbed on the glass. The cells are then infected by gently adding to each box about 100 ml. of a suspension of the particular virus in medium 199. The following strains of viruses were used: Polio Type I (Mahoney strain), Polio Type III (Saukett strain), Pseudorabies (Aujeszky strain), Coxsackie $B_5$ (Conn. 5 strain), Vaccinia (V–1 Lindenman strain), Measles (Edmonston strain), Coxsackie A2 (Coe strain).

After allowing a time of from about 1 to about 3 hours for adsorption of the virus on the cells, the infecting medium is removed from the plate. A mixture of 75 ml. of double strength medium 199 with calf serum, penicillin, and streptomycin and 75 ml. of double strength agar (Difco purified) solution (2 percent) at 50° C. is poured over the virus-infected cell monolayer in each box and allowed to solidify at a level attitude. Filter paper disks are dipped in solutions of substances to be tested, dried in a vacuum oven at no higher than 37° C. for about one hour and then placed on the surface of the agar in the boxes. The boxes are incubated at about 37° C. for about 84 hours, the boxes are flooded with aqueous 10 percent formalin-2 percent sodium acetate solution, and the agar is floated off with water. The cells remaining are stained with Wright's stain. Toxicity, anti-viral activity, and the microscopic appearance of the cells are recorded following the procedure of Herrmann et al., Proc. Soc. Exp. Biol. ad Med., 103, 625 (1960).

Plaques are seen in those areas of the plate where the virus has infected and reproduced in the cells. Zones of toxicity are observed and the diameter thereof measured in millimeters when the test compound kills the cells under and around the filter paper disk. Anti-viral activity of the test compounds is detected by observing the absence of plaques and a heavier growth of cells in a zone under and around the filter paper disk, the diameter of this zone being measured in millimeters.

The cells in a zone of activity are examined with a microscope to determine the presence and degree of drug and/or virus damage. The staining is graded 1+, 2+, 3+, 4+, and negative:

4+. Dark stained areas which, upon microscopic examination, show healthy cells with no visible virus or drug damage;

3+. Less darkly stained areas that show no virus damage but appear less healthy;

2+. Area showing healthy cells with a moderate amount of virus breakthrough;

1+. Areas showing healthy cells with a greater virus breakthrough;

—. No viable cells.

Table 1 which follows sets forth the results of testing typical compounds coming within the scope of the above formula against 7 viruses. In the table, column 1 gives the name of the compound; column 2, the rate in terms of mcg./ml. at which the compound was applied to the filter paper disks; column 3, the diameter in millimeters of the zone of cell toxicity; column 4, the diameter in millimeters of the zone of virus inhibition by the test compound; column 5, the grading of stained areas, and column 6, the name of the virus against which the compound was tested.

TABLE 1

| Name of compound | Rate in mcg./ml. | Diameter of zone of— Cell toxicity in mm. | Virus inhibition in mm. | Grade of stained area | Virus |
|---|---|---|---|---|---|
| Methyl 2-phenoxathiinyl ketone | 125 | - | 25 | 3+ | Polio III. |
| | 250 | - | 30 | 3+ | |
| | 500 | - | 30 | 4+ | |
| | 1,000 | - | 30 | - | |
| | 2,000 | - | 20 | 3+ | Herpes. |
| 2-(hydroxyethyl)phenoxathiin | 125 | - | 25 | 3+ | Polio III. |
| | 250 | - | 30 | 3+ | |
| | 500 | 7 | 46 | 4+ | |
| | 1,000 | 14 | 50 | 4+ | |
| | 2,000 | 25 | 40 | 4+ | Measles. |
| Methyl 2-phenoxathiinyl ketone oxime | 125 | - | 28 | 4+ | Polio III. |
| | 250 | - | 28 | 4+ | |
| | 500 | - | 30 | 4+ | |
| | 1,000 | - | 30 | 4+ | |
| | 2,000 | 7 | 21 | 4+ | Herpes. |
| | 2,000 | 25 | 40 | 4+ | Measles. |
| | 2,000 | - | 14 | 3+ | Vaccinia. |
| 2-(1-hydroxy-1-methylethyl)phenoxathiin | 1,000 | 15 | 25 | 2+ | Polio III. |
| | 2,000 | 24 | 30 | 2+ | Vaccinia. |
| | 2,000 | 24 | 34 | 4+ | Pseudorabies. |
| | 2,000 | 23 | 35 | 3+ | Herpes. |
| | 2,000 | 23 | 30 | 2+ | Coe. |
| Ethyl 2-phenoxathiinyl ketone | 125 | - | 10 | 2+ | Polio III. |
| | 250 | 7 | 28 | 2+ | |
| | 500 | 8 | 26 | 3+ | |
| | 1,000 | 12 | 28 | 4+ | |
| | 2,000 | 11 | 23 | 3+ | Vaccinia. |
| | 2,000 | 7 | 20 | 4+ | Herpes. |
| | 2,000 | 8 | 13 | 2+ | Measles. |
| Methyl 2-phenoxathiinyl ketone 10.10-dioxide | 2,000 | - | 10 | 3+ | Pseudorabies. |
| 2-(1-hydroxyethyl)phenoxathiin 10,10-dioxide | 2,000 | 20 | 32 | 1+ | Vaccinia. |
| | 2,000 | 10 | 20 | 3+ | Pseudorabies. |
| | 2,000 | - | 22 | 2+ | Herpes. |
| | 2,000 | - | 20 | 4+ | Measles. |
| Methyl 2-thienthrenyl ketone | 125 | - | 13 | 1+ | Polio III. |
| | 250 | - | 14 | 2+ | |
| | 500 | 7 | 20 | 3+ | |
| | 1,000 | 7 | 22 | 3+ | |
| | 2,000 | 8 | 22 | 3+ | Pseudorabies. |
| 2-(1-hydroxyethyl)thianthrene | 250 | - | 22 | 2+ | Polio III. |
| | 500 | 7 | 27 | 3+ | |
| | 1,000 | 12 | 30 | 3+ | |
| | 2,000 | 22 | 30 | 3+ | Herpes. |
| Methyl 2-(xanthenyl)ketone | 125 | - | 35 | 4+ | Polio III. |
| | 250 | 8 | 36 | 4+ | |
| | 500 | 9 | 36 | 4+ | |
| | 1,000 | 10 | 40 | 3+ | |
| | 2,000 | 9 | 20 | 2+ | Vaccinia. |
| | 2,000 | - | 14 | 3+ | Measles. |
| Methyl 2-(dibenzofuranyl)ketone | 125 | - | 30 | 4+ | Polio III. |
| | 250 | - | 38 | 4+ | |
| | 500 | 7 | 40 | 4+ | |
| | 1,000 | 10 | 46 | 4+ | |
| | 2,000 | 15 | 22 | 2+ | Vaccinia. |
| 2-(1-hydroxyethyl)xanthene | 125 | - | 31 | 4+ | Polio. |
| | 250 | - | 38 | 4+ | |

As has been demonstrated by the data supplied in Table 1, compounds coming within the scope of the above formula are able to suppress the growth of several viruses when added to a medium in which the virus is growing at rates as low as 125 p.p.m. The compounds of this invention can therefore be used in aqueous solution, preferably with a surfactant, to decontaminate surfaces on which polio, coxsackie, measles and other viruses are present, such surfaces including laboratory glassware, laboratory working surfaces and similar areas in hospitals.

In addition, certain of the compounds of this invention, and in particular 2 - (1 - hydroxyethyl)phenoxathiin, can be used in the preparation of vaccines, either live or killed, against viruses, particularly Type III polio. When 2-(1-hydroxyethyl)phenoxathiin is added to a medium in which polio III is growing, there is a rapid development of drug resistant variants. Passage of these variants by subculturing in the presence of drug and by selecting atypical plaques yielded variants that were not only drug resistant, but also drug dependent. Vaccines against Type III polio can thus be prepared from the drug-resistant, drug-dependent virus, and these vaccines will be safer than ordinary live-virus vaccines since the virus will not reproduce in the absence of drug. The isolated virus variants are still neutralized by polio III anti-serum.

Compounds coming within the scope of the above formula are prepared according to the following specific examples.

EXAMPLE 1

Methyl 2-phenoxathiinyl ketone

A solution of 39.3 g. of acetylchloride in 100 ml. of 1,2-dichloroethane was added to 200 ml. of 1,2-dichloroethane containing 66.5 g. of aluminum chloride. This mixture was stirred at room temperature for about 30 minutes and then added in dropwise fashion with stirring to a chilled (0–5° C.) solution containing 100 g. of phenoxathiin in 500 ml. of 1,2-dichloroethane. The reaction mixture was allowed to stand at room temperature overnight, and was then poured into a mixture of 300 ml. of 12 N hydrochloric acid and 500 ml. of ice. The organic layer was separated, and the acidic layer extracted twice with chloroform. The organic layers were combined, dried, and the volatile substituent removed therefrom by evaporation in vacuo leaving as a residue methyl 2-phenoxathiinyl ketone which melted at about 117–118° C. after recrystallization from a benzenehexane solvent mixture.

*Analysis.*—Calcd. (percent): C, 69.40; H, 4.16; O, 13.21; S, 13.24. Found (percent): C, 69.67; H, 4.46; O, 13.09; S, 13.26.

Other compounds preparable by the method of the above example include:

Methyl 2-thianthrenyl ketone, M.P.=70–71° C.

*Analysis.*—Calcd. (percent): C, 65.08; H, 3.90. Found (percent): C, 64.88; H, 3.85.

Methyl 2-(3-methyl)dibenzofuranyl ketone, M.P.=86–88° C.

*Analysis.*—Calcd. (percent): C, 80.33; H, 5.39. Found (percent): C, 80.13; H, 5.46.

Ethyl 2-phenoxathiinyl ketone, M.P.=77–79° C.

*Analysis.*—Calcd. (percent): C, 70.28; H, 4.72. Found (percent): C, 70.42; H, 4.89.

Methyl 2-dibenzofuranyl ketone, M.P.=83–84° C.

*Analysis.*—Calcd. (percent): C, 79.98; H, 4.79. Found (percent): C, 79.86; H, 5.45.

Methyl 2-xanthenyl ketone, M.P.=103–104° C.

*Analysis.*—Calcd. (percent): C, 80.33; H, 5.39. Found (percent): C, 80.09; H, 5.49.

EXAMPLE 2

2-(1-hydroxyethyl)phenoxathiin

A solution of 30.4 g. of methyl 2 - phenoxathiinyl ketone in 750 ml. methanol was chilled to about 15° C. About 4.7 g. of sodium borohydride were added to this chilled solution over a period of about 15 minutes. The reaction mixture was stirred at about 15° C. for an additional ½ hour, and then refluxed for about 1 hour. The methanol was removed by evaporation in vacuo, and the residue, comprising 2 - (1 - hydroxyethyl)phenoxathiin formed in the above reaction, was dissolved in ether. The ether solution was washed successively with 5 N aqueous hydrochloric acid, 10 percent aqueous sodium bicarbonate and water. Evaporation of the washed ether solution yielded 30.9 g. of 2 - (1 - hydroxyethyl)phenoxathiin, which melted at about 66–68° C. after recrystallization from a benzene-hexane solvent mixture.

*Analysis.*—Calcd. (percent): C, 68.82; H, 4.95; S, 13.13. Found (percent): C, 68.58; H, 4.99; S, 13.13.

The following compounds were prepared by the procedure of the above example:

2-(1-hydroxyethyl)thianthrene.

*Analysis.*—Calcd. (percent): C, 64.58; H, 4.65. Found (percent): C, 64.33; H, 4.58.

2-(1-hydroxyethyl)xanthene, M.P.=85–87° C.

*Analysis.*—Calcd. (percent): C, 79.62; H, 6.24. Found (percent): C, 79.69; H, 6.13.

Acetate, propionate and butyrate derivatives of the above alcohols are readily prepared by reaction of the alcohol with the appropriate acid anhydride, yielding for example, 2-(1-acetoxyethyl)penoxathiin, 2 - (1 - propionoxyethyl)thianthrene and 2 - (1 - n - butyroxyethyl)xanthene.

EXAMPLE 3

2-(1-methoxyethyl)phenoxathiin

Under a nitrogen atmosphere, 1 g. of 50 percent sodium hydride in oil suspension was added to 25 ml. of toluene. A solution of 5 g. of 2-(1-hydroxyethyl)phenoxathiin in 100 ml. of toluene was added thereto, thus forming the sodium salt of the alcohol. The reaction mixture was refluxed for about two hours and then cooled to room temperature. Three grams of methyliodide were added with stirring. The reaction mixture was washed with water to remove the sodium iodide formed in the above reaction, dried, filtered, and the toluene evaporated therefrom in vacuo. The residue proved to be a mixture of starting material and desired product by thin layer chromatography. The residue was dissolved in benzene and chromatographed over 300 g. of silica gel with a benzene ethyl acetate eluant. Evaporation of the eluate to dryness yielded a residue, distillation of which by shortpath distillation yielded 2 - (1 - methoxyethyl)phenoxathiin. The product proved to be one-spot material by thin-layer chromatography.

*Analysis.*—Calcd. (percent): C, 69.75; H, 5.46; O, 12.39. Found (percent): C, 69.49; H, 5.23; O, 12.52.

EXAMPLE 4

Methyl 2-phenoxathiinyl ketone oxime

Twenty grams of powdered sodium hydroxide were added portion-wise to a mixture of 24.3 g. of methyl phenoxathiin ketone, 11.1 g. of hydroxylamine hydrochloride, 40 ml. of ethanol and 8 ml. of water. The resulting mixture was refluxed for about 15 minutes and then poured into 10 percent aqueous hydrochloric acid. The acid solution was extracted several times with 50 ml. portions of chloroform. The chloroform extracts were combined and dried, and the chloroform removed therefrom by evaporation in vacuo. Recrystallization from ethanol of the resulting residue, comprising methyl-2-phenoxathiin ketone oxime formed in the above reaction yielded purified oxime melting at about 152–154° C.

*Analysis.*—Calcd. (percent): C, 65.35; H, 4.31; N, 5.45. Found (percent): C, 65.54; H, 4.33; N, 5.43.

Other compounds prepared by the procedure of the above example include:

Methyl 2-(thianthrenyl) ketone oxime, M.P.=132–133° C.

*Analysis.*—Calcd. (percent): C, 61.54; H, 4.06. Found (percent): C, 61.78; H, 4.22.

EXAMPLE 5

2-(1-hydroxy-1-methylethyl)phenoxathiin

To a solution of 12.2 g. of methyl phenoxathiin ketone in 100 ml. of tetrahydrofurane were added 29 ml. of a 0.125 molar methyl Grignard reagent. The reaction mixture was stirred overnight at room temperature and then poured into an excess of saturated ammonium chloride solution. 2-(1-hydroxy-1-methylethyl)-phenoxathiin was isolated therefrom by standard procedures and melted at about 95–96° C. after recrystallization from hexane.

*Analysis.*—Calcd. (percent): C, 69.73; H, 5.46; O, 12.38. Found (percent): C, 69.90; H, 5.68; O, 12.44.

EXAMPLE 6

Methyl 2-phenoxathiinyl ketone-10-oxide

Five grams of methyl phenoxathiin ketone were dissolved in 100 ml. of methylene chloride. A solution containing 5.3 g. of m-chloroperbenzoic acid in 25 ml. of methylene chloride was added to the solution of the phenoxathiin maintained at a temperature of about —70° C. The reaction mixture was washed with aqueous sodium bicarbonate, and the solvent evaporated in vacuo. Thin layer chromatography on the residue indicated a mixture of sulfoxide and sulfone. The components of the mixture were separated by chromatography over silica gel. The sulfone was eluted with a 4:1 benzene-ethyl acetate solvent mixture, and the desired sulfoxide with ethyl acetate alone. The sulfoxide melted at 128–130° C.

*Analysis.*—Calcd. (percent): C, 65.09; H, 3.90; O, 18.58. Found (percent): C, 65.28; H, 4.12; O, 18.54.

Other compounds prepared by the procedure of the above example include:

2-(1-hydroxyethyl)phenoxathiinyl - 10 - oxide, M.P.= 105–107° C.

*Analysis.*—Calcd. (percent): C, 64.59; H, 4.64. Found (percent): C, 64.86; H, 4.41.

EXAMPLE 7

Methyl 2-phenoxathiinyl ketone-10,10-dioxide

About 5 g. of methyl 2-phenoxathiinyl ketone were dissolved in 50 ml. of glacial acetic acid. About 5.5 ml. of hydrogen peroxide were added rapidly with stirring. After the addition was complete, the reaction mixture was heated at refluxing temperature for about 4 hours. Upon cooling, methyl 2-phenoxathiinyl ketone-10,10-dioxide separated as a crystalline precipitate. M.P.=164–165° C.

*Analysis.*—Calcd. (percent): C, 61.30; H, 3.64; O, 23.33. Found (percent): C, 61.27; H, 3.77; O, 23.09.

Other compounds prepared by the procedure of the above example include:

2 - (1 - hydroxyethyl)phenoxathiinyl - 10,10 - dioxide, M.P.=101–103° C.

*Analysis.*—Calcd. (percent): C, 60.85; H, 4.37. Found (percent): C, 60.82; H, 4.48.

In synthesizing compounds coming within the scope of Formula I above, the above procedures apply substantially without variation to the various heterocyclic nuclei set forth on page 2, except for those compounds in which Y is NH, such as phenothiazine and phenoxazine. With these latter heterocyclic nuclei, it is usually necessary to protect the amine group as by acylation, the acyl group being readily removable either during or after the reaction. Protecting groups other than acyl groups can be used, and such protecting groups will readily suggest themselves to those skilled in the art.

We claim:

1. A method for suppressing the growth of a virus selected from the group consisting of polio, measles, herpes, vaccinia, pseudo-rabies, and Coxsackie in an in vitro hibitat comprising and applying to said virus a solution containing from 125 to 2,000 mcg./ml. of a compound represented by the formula:

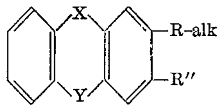

wherein
X is oxygen, sulfur, sulfoxide or sulfone;
Y is sulfur, oxygen, sulfoxide, sulfone, NH, methylene, ethylene, vinyl or direct bond;
R is

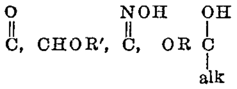

R' is hydrogen or

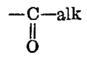

R'' is hydrogen or methyl; and
alk is $C_1$–$C_3$ alkyl.

2. A process according to claim 1, wherein the antiviral agent is methyl 2-phenoxathiinyl ketone.

3. A process according to claim 1 wherein the antiviral agent is 2-(1-methoxyethyl)phenoxathiin.

4. A process according to claim 1 in which the virus is Type III polio virus.

References Cited

Flowers et al., J. Am. Chem. Soc., 71, pp. 3102–3103 (1949).

Deasy, Chem. Rev., 32, pp. 173–194 (1943).

JEROME D. GOLDBERG, Primary Examiner

U.S. Cl. X.R.

424—244, 246, 248, 275, 277, 283, 285